Figure 1:
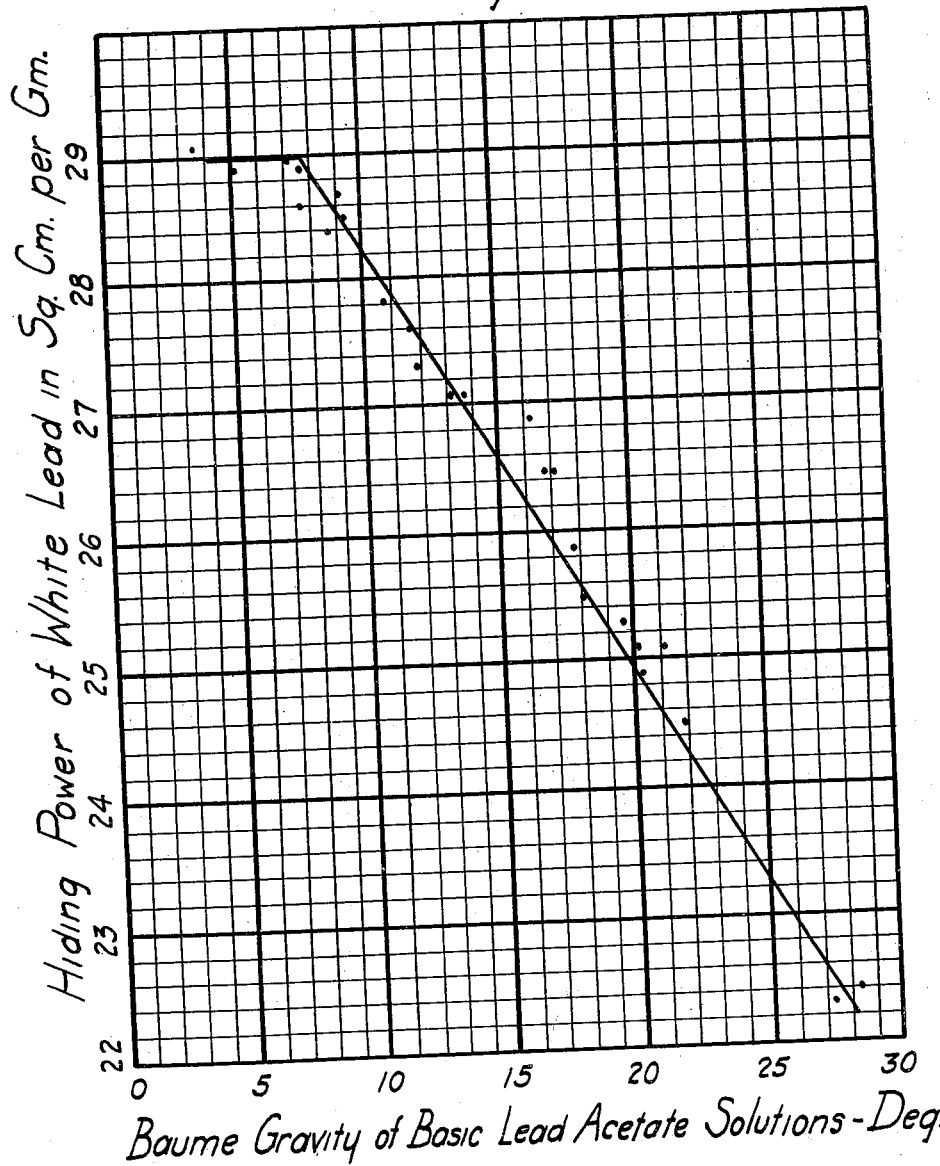

April 26, 1938.  E. D. TURNBULL  2,115,090
WHITE LEAD AND METHOD OF PRODUCTION
Filed June 3, 1936  2 Sheets-Sheet 1

Inventor
Edward D. Turnbull
per Milton Zucker
Attorney

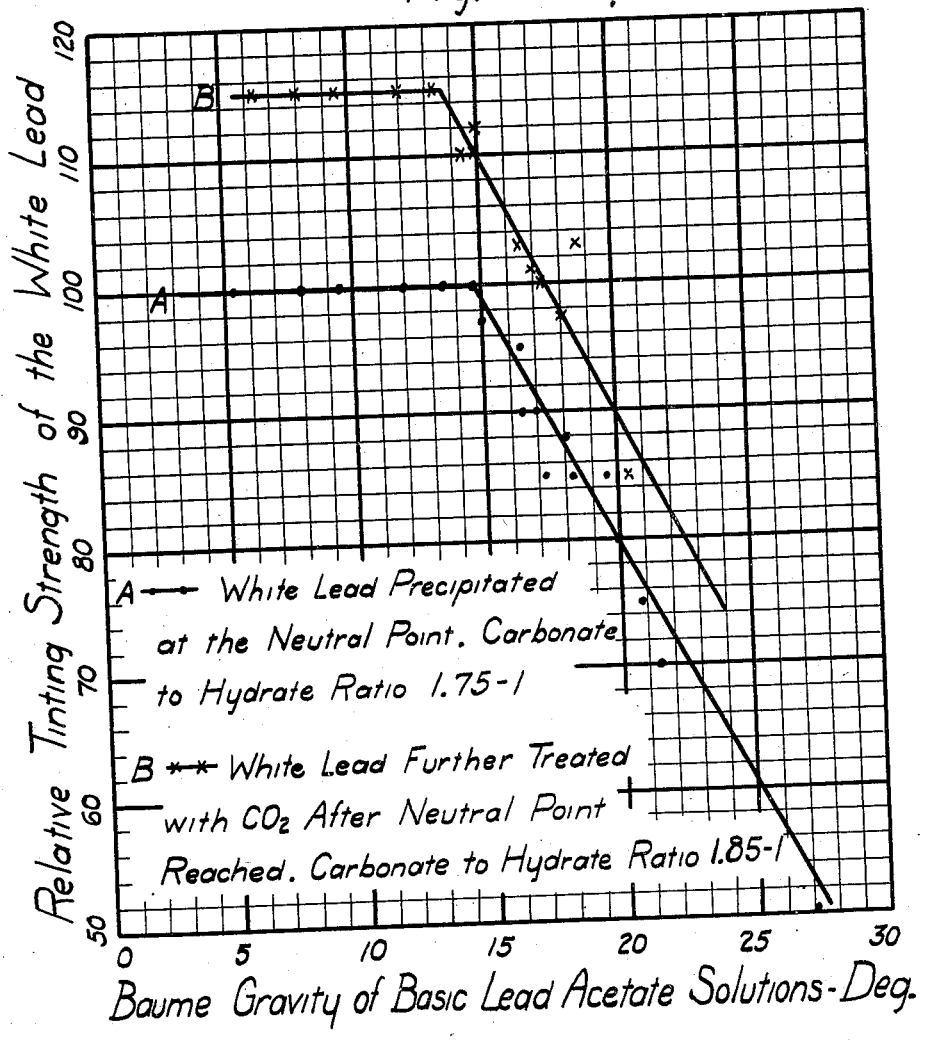

Patented Apr. 26, 1938

2,115,090

UNITED STATES PATENT OFFICE 2,115,090

WHITE LEAD AND METHOD OF PRODUCTION

Edward D. Turnbull, Clarks Summit, Pa., assignor to The Glidden Company, Cleveland, Ohio, a corporation of Ohio Application June 3, 1936, Serial No. 83,275

11 Claims. (Cl. 23—69)

This invention relates to an improved method of manufacturing basic carbonate white lead by a precipitation process, and the white lead so produced, characterized by its high hiding power and tinting strength. In particular, this invention relates to the governing of the process so that these characteristics may be controlled. In the past, many precipitation processes for the production of white lead have been developed, but all have been a failure because the underlying principles that govern the control of the hiding power and tinting strength of the finished white lead have not been understood and no method of control known. A most thorough search of the literature has failed to bring forth any references in this connection. Hence in the past the white lead produced by precipitation methods has been deficient in hiding power and tinting strength. I have, however, discovered the principles that govern these characteristics and the methods by which they may be controlled to produce white lead showing a maximum of these qualities. These principles are set forth herewith and represent a distinct advance in the art of producing white lead.

Most precipitation processes in the past, have used very strong solutions of basic lead acetate from which to precipitate their white lead, and have produced a white lead of low hiding power and poor tinting strength. These solutions have ranged from sixteen to twenty degrees and above in Baumé gravity. I have found, however, that the use of more dilute solutions produces a white lead of better covering power and tinting strength. Basic lead acetate solutions are generally made by dissolving lead oxide in lead acetate solution. The amount of lead oxide capable of being dissolved, and the nature of the basic lead acetate formed, are dependent on the strength of the neutral lead acetate solution. It is well known that as the strength of the neutral lead acetate solution increases, the amount of lead oxide dissolved will increase in uniform proportion until a certain concentration of neutral lead acetate is reached, when the proportion suddenly changes, showing that a new basic lead acetate compound is being formed. The first definite break in this relationship occurs when the neutral lead acetate solution contains 5.36 per cent neutral lead acetate, and the basic solution made therefrom has a Baumé gravity of about 15 degrees at 24 degrees C. temperature.

I have found that the nature of the basic lead acetate solution from which the white lead is precipitated, has an effect on the physical characteristics of the white lead so produced. Also even below the concentration of solution where a new basic lead acetate is formed that the strength of the basic lead acetate solution affects the qualities of the white lead made therefrom. I have found that white lead made from basic lead acetate solution of 8 degrees or less in Baumé gravity at 24 degrees C. produces white lead of the highest hiding power and tinting strength. Moreover, if the lead carbonate to lead hydrate ratio of the white lead is above a certain limit, no matter what the strength of the basic lead acetate solution from which it was precipitated, the hiding power and tinting strength will be deficient.

I find that in precipitating white lead from basic lead acetate solution by the action of carbon dioxide gas, that the carbon dioxide reacts with the basic lead of the solution, to form a precipitate of basic lead carbonate which has a lead carbonate to lead hydrate ratio substantially below 2.2 parts lead carbonate to 1 part lead hydrate; and continues to precipitate this from the solution until the solution becomes neutral, that is, when all the basic lead has been precipitated out. When this point is reached, further treatment with carbon dioxide causes the carbon dioxide to react with the precipitate itself, producing a basic lead carbonate of higher lead carbonate to lead hydrate ratio than the original precipitate, the composition of the resulting product depending upon the length of time the precipitate is treated with the carbon dioxide. Moreover, I find that as the lead carbonate to lead hydrate ratio of the white lead rises above 2.2 to 1, the hiding power and tinting strength fall off rapidly.

My discovery falls into two distinct categories. I have found first that the concentration of the solution plays an important part in determining hiding power and tinting strength, but that these properties are somewhat different functions of solution strength.

Referring to Figure 1, the curve therein shows the effect of the gravity of the basic lead acetate solution on the hiding power. The data for this curve were obtained by preparing neutral lead acetate solutions of various concentrations and dissolving therein the full amount of lead oxide capable of being dissolved, to make basic lead acetates of various Baumé, at 24 degrees C. The solutions were then treated with carbon dioxide (present in the flue gas obtained by the combustion of coal, and washed to remove impurities) to the point where all the basic lead had been precipitated. This point I call the neutral point, although it should be understood that the neutral lead acetate left is of acid reaction (pH about 5.9); the term neutral indicates the absence of basic lead. The best test I know of for this point is to treat a drop of the solution with hydrogen peroxide; a brown discoloration indicates the presence of basic lead. The precipitates were filtered, washed and dried; and lead carbonate—lead hydrate ratio, and hiding power were determined on all samples. Regardless of strength of solution, within the range indicated on the curve, the carbonate hydrate ratio was approximately 1.75 to 1.0, within experimental error. The highest figure obtained was a ratio of 1.80 to 1.0, the lowest, 1.73 to 1.0, the average of 17 determinations being approximately 1.755.

As indicated in Figure 1, the hiding powers, when plotted, reveal themselves as a definite function of the gravity of the basic lead acetate solution. This remains at the high level of 29.0 square centimeters per gram for solutions up to approximately 8.0 degrees Baumé, but falls in a straight line relationship thereafter at a rate approximating 0.31 square centimeter per gram per degree Baumé rise, up to about 25 degrees. Here the figures become very erratic, due to the difficulties in controlling these concentrated solutions; and the curve is meaningless beyond. Some experimental data indicates that the curve tends to become horizontal again at or about this point, other that it continues its downward course at less rapid rate.

Similar tests were made to determine tinting strength, plotted on the curves in Figure 2. Here the carbonation of the lead acetate was run to the neutral point, and half of the precipitate and solution removed. The remainder was slowly and carefully carbonated further, to get a substantial increase in carbonation, the carbonate hydrate ratio being maintained at 1.85±0.01. The precipitates were filtered, washed and dried as above. The tinting strength of pigment precipitated at 8 degrees Baumé, at the neutral point, was taken as 100, and the curves plotted for (A) pigment at the neutral point and (B) pigment at just above the ratio of the neutral point, i. e. 1.85 to 1.0.

Curve A clearly indicated that the tinting strength of the pigment is a function of the type of basic lead acetate solution. The dilute type of solution (approximately 15 degrees Baumé and less) gives a substantially uniform tinting strength; while the concentrated type of solution gives a steadily falling tinting strength as indicated by the curve, which, like the hiding power curve, becomes indeterminate at about 25 degrees Baumé.

Curve B illustrates the second phase of my invention. When carbonation is continued past the neutral point, an almost immediate sharp rise in tinting strength occurs; in plant practice, where thorough admixture of solution and gas is obtained, the 1.85 to 1.0 ratio is reached within a few seconds after the white test. This increase in tinting strength remains substantially constant until a lead carbonate lead hydrate ratio of 2.2 to 1.0 is obtained; thereafter it drops sharply. This can be illustrated by the carbonation of a typical 8 degree Baumé solution, from which samples were taken at intervals:

| Ratio | Hiding power | Tinting strength |
|---|---|---|
| | sq. cm./gram | |
| 1.75 to 1.0 | 29.0 | 100 |
| 1.85 to 1.0 | 29.0 | 115 |
| 2.00 to 1.0 | 28.7 | 115 |
| 2.18 to 1.0 | 29.0 | 116 |
| 2.20 to 1.0 | 28.9 | 113 |
| 2.24 to 1.0 | 28.5 | 106 |
| 2.85 to 1.0 | 26.0 | 94 |
| 3.10 to 1.0 | 25.2 | 75 |

The rapid falling off in both hiding power and tinting strength is indicative of the results generally obtained.

It should be noted, in reference to Figure 2, that while the distance between curves A and B corresponds to 15% in the range covered by the dilute type solution, curve B falls away more rapidly than curve A, with the result that the increase in tinting is not as noticeable in the higher gravity ranges.

I believe that the failures of the prior art precipitation processes were due to two causes— the use of high gravity type solutions, and failure to recognize the necessity for maintaining the carbonate hydrate ratio above that at the neutral point, but not above 2.2 to 1.0, in order to get maximum tinting. Some prior art workers finished in basic solutions, thus holding their tinting strength down to that at the neutral point, the precipitates being substantially the same during basicity as at the neutral point. Others continued carbonation, but failed to control this carbonation. This is not difficult to understand, as in good plant practice, using a 6.5 degree Baumé solution heated if necessary to about 80 degrees F. the time elapsing between the neutral point and the 2.2 to 1.0 ratio is less than 90 seconds.

In the preferred form of my invention, I prepare a neutral lead acetate solution of about 2.2 degrees Baumé by dissolving corroder's lead in acetic acid, and diluting. I then dissolve lead oxide in this solution, to get a basic lead acetate of about 6.5 degrees Baumé. The solution is then sprayed countercurrent against a stream of carbon dioxide bearing gas, preferably purified flue gas, although any source of $CO_2$ is satisfactory. Samples are taken from time to time, until the white test, indicating neutrality, is reached. Carbonation is continued for exactly one minute, and the stream is then cut off. The precipitate is settled, through a Dorr thickener, the neutral lead acetate being returned to the vats for making new basic lead acetate solution. The pulp is filtered, washed, dried and ground, in a conventional manner.

I prefer to carry my precipitate as close to 2.2 to 1.0 ratio as possible; as such precipitates filter and handle better than the lower carbonate ratio pigments.

As indicated above, I consider my invention to reside in two contributions to the art, the teaching that high hiding power is dependent on the use of solutions of 8 degrees Baumé or less, and the teaching that high tinting strength is dependent on controlled further carbonation beyond the neutral point, of solutions of the low gravity type, below approximately 15 degrees Baumé in gravity.

I further consider that my pigment is a new product, in that its tinting strength and hiding power are so much higher than prior art pigment.

This application is a continuation in part of my application, Serial No. 645,418, filed December 21, 1932.

I claim:

1. The step in the process of producing basic carbonate white lead which comprises treating a solution of substantially basic lead acetate of 8 degrees Baumé or less in gravity, when measured at 24 degrees C., with carbon dioxide.

2. The process of producing basic carbonate white lead which comprises treating a solution of substantially basic lead acetate of 8 degrees Baumé or less in gravity, when measured at 24 degrees C., with carbon dioxide until the lead carbonate to lead hydrate ratio of the pigment precipitated is 2.2 to 1.0.

3. The process of producing carbonate white lead which comprises treating a solution of substantially basic lead acetate of 8 degrees Baumé or less in gravity, when measured at 24 degrees C., with carbon dioxide, until the basicity of the solution has been neutralized, and then further treating with carbon dioxide, stopping the further treatment at such a point that the lead carbonate to lead hydrate ratio of the pigment is not above 2.2 to 1.0.

4. The process of producing basic carbonate white lead which comprises treating a solution of substantially basic lead acetate of 8 degrees Baumé or less in gravity, when measured at 24 degrees C., with carbon dioxide, until the basicity of the solution has been neutralized, and then further treating with carbon dioxide until the lead carbonate to lead hydrate ratio of the pigment is 2.2 to 1.0.

5. The process of producing basic carbonate white lead which comprises treating a solution of substantially basic lead acetate of 15 degrees Baumé or less gravity, when measured at 24 degrees C., with carbon dioxide, until the basicity of the solution has been neutralized, and then further treating with carbon dioxide to improve the tinting strength of the precipitate, stopping the further treatment at such a point that the lead carbonate to lead hydrate ratio of the pigment is not above 2.2 to 1.0.

6. The process of producing basic carbonate white lead which comprises treating a solution of substantially basic lead acetate of 15 degrees Baumé or less gravity, when measured at 24 degrees C., with carbon dioxide, until the basicity of the solution has been neutralized, and then further treating with carbon dioxide to improve the tinting strength of the precipitate, stopping the further treatment at such a point that the lead carbonate to lead hydrate ratio of the pigment is 2.2 to 1.0.

7. A basic carbonate white lead of high hiding power and tinting strength, produced by treating a solution of substantially basic lead acetate of 8 degrees Baumé or less in gravity, when measured at 24 degrees C., with carbon dioxide, until the lead carbonate to lead hydrate ratio of the pigment precipitated is 2.2 to 1.0.

8. A basic carbonate white lead of high hiding power and tinting strength, produced by treating a solution of substantially basic lead acetate of 8 degrees Baumé or less in gravity, when measured at 24 degrees C., with carbon dioxide, until the basicity of the solution has been neutralized, and then further treating with carbon dioxide, stopping the further treatment at such a point that the lead carbonate to lead hydrate ratio of the pigment is not above 2.2 to 1.0.

9. A basic carbonate white lead of high hiding power and tinting strength, produced by treating a solution of substantially basic lead acetate of 8 degrees Baumé or less in gravity, when measured at 24 degrees C., with carbon dioxide, until the basicity of the solution has been neutralized, and then further treating with carbon dioxide until the lead carbonate to lead hydrate ratio of the pigment is 2.2 to 1.0.

10. A basic carbonate white lead of improved tinting strength, produced by treating a solution of substantially basic lead acetate of 15 degrees Baumé or less gravity, when measured at 24 degrees C., with carbon dioxide, until the basicity of the solution has been neutralized, and then further treating with carbon dioxide to improve the tinting strength of the precipitate, stopping the further treatment at such a point that the lead carbonate to lead hydrate ratio of the pigment is not above 2.2 to 1.0.

11. A basic carbonate white lead of improved tinting strength, produced by treating a solution of substantially basic lead acetate of 15 degrees Baumé or less gravity, when measured at 24 degrees C., with carbon dioxide until the basicity of the solution has been neutralized, and then further treating with carbon dioxide to improve the tinting strength of the precipitate, stopping the further treatment at such a point that the lead carbonate to lead hydrate ratio of the pigment is 2.2 to 1.0.

EDWARD D. TURNBULL.